United States Patent [19]

Yoder

[11] Patent Number: 4,848,423
[45] Date of Patent: Jul. 18, 1989

[54] GUARD UNIT FOR A STUMP REMOVING MACHINE CUTTER WHEEL

[75] Inventor: Alan J. Yoder, Oskaloosa, Iowa

[73] Assignee: Vermeer Manufacturing Co., Pella, Iowa

[21] Appl. No.: 277,653

[22] Filed: Nov. 29, 1988

[51] Int. Cl.$^4$ .............................................. A01G 32/06
[52] U.S. Cl. .................. 144/2 N; 144/251 R
[58] Field of Search .................. 37/2 R; 56/17.4, 190, 56/192, 320.1, 341; 144/2 N, 34 R, 251 R, 252 R

[56] References Cited

U.S. PATENT DOCUMENTS

| | | | |
|---|---|---|---|
| 1,312,450 | 8/1919 | McKay et al. | 144/2 N |
| 3,568,740 | 3/1971 | Speakman | 144/2 N |
| 3,732,905 | 5/1923 | Pickel | 144/2 N |
| 4,355,670 | 10/1982 | Ohrberg et al. | 144/34 R |

Primary Examiner—W. Donald Bray
Attorney, Agent, or Firm—Rudolph L. Lowell

[57] ABSTRACT

The guard unit for the cutter wheel of a stump removing machine has an upper member pivotally mounted on the machine for up and down pivotal movement, within defined limits, to maintain a shield member in a continuous covering clearance with the cutter wheel during a stump removal operation. A bottom member of the guard unit has a central portion and outwardly and upwardly inclined end portions. The central portion is rideable on the top surface of a stump during a cutting movement laterally of the stump and on a reversal of the lateral cutting movement an end portion is engageable with an edge portion of the top surface to position the central portion on the stump top surface.

6 Claims, 3 Drawing Sheets

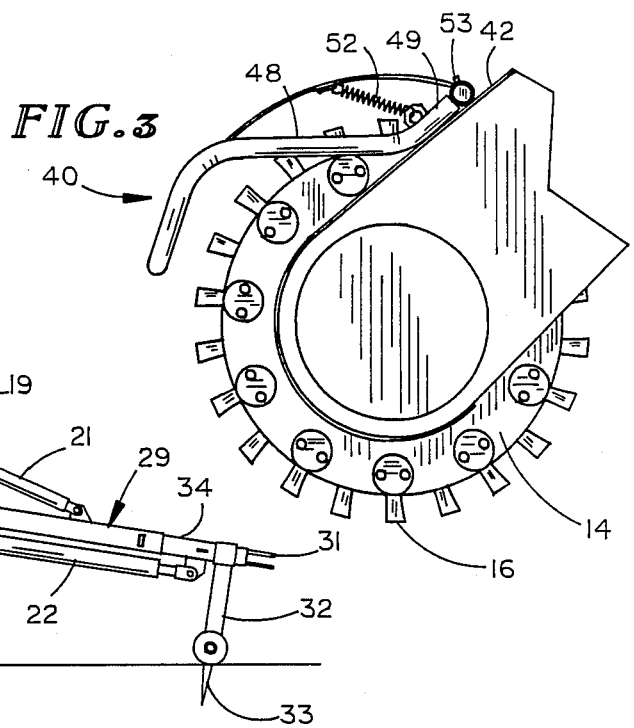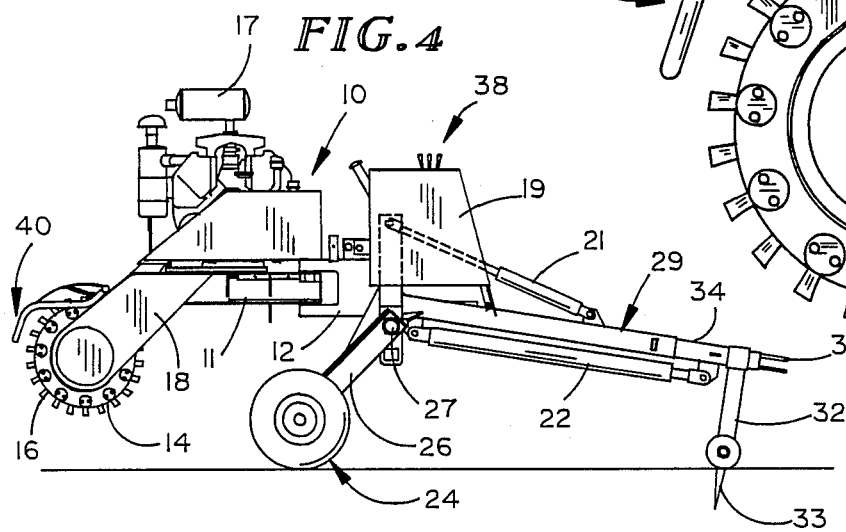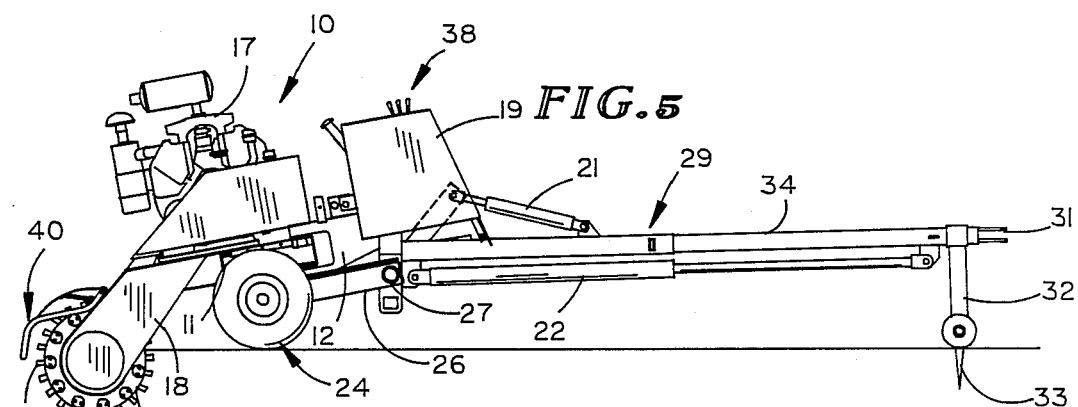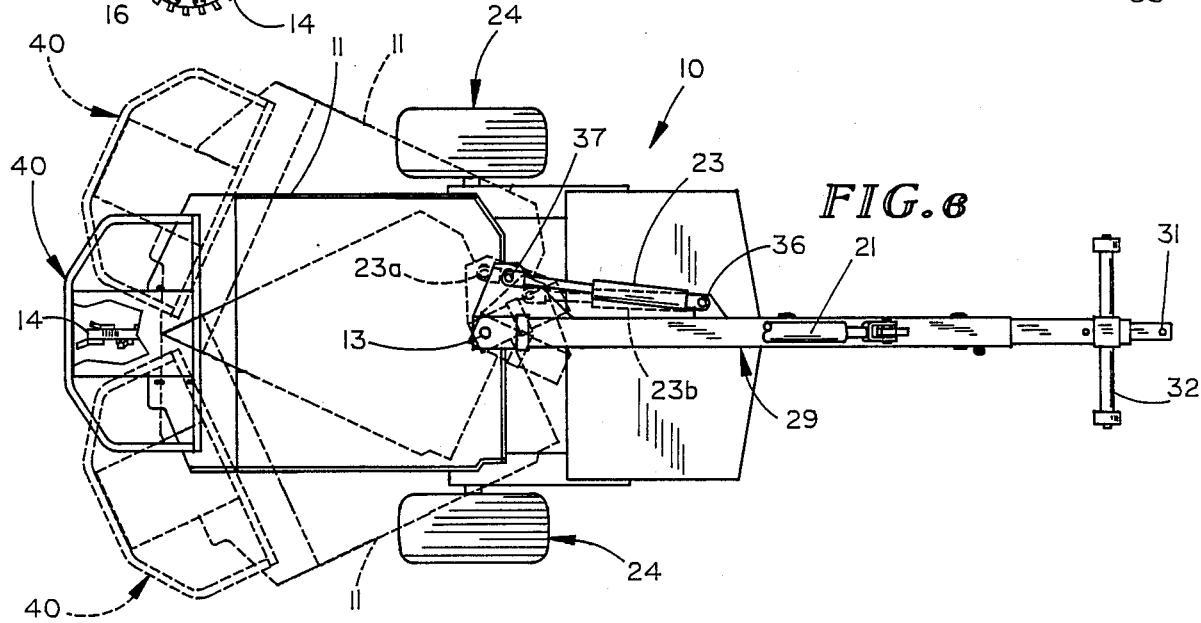

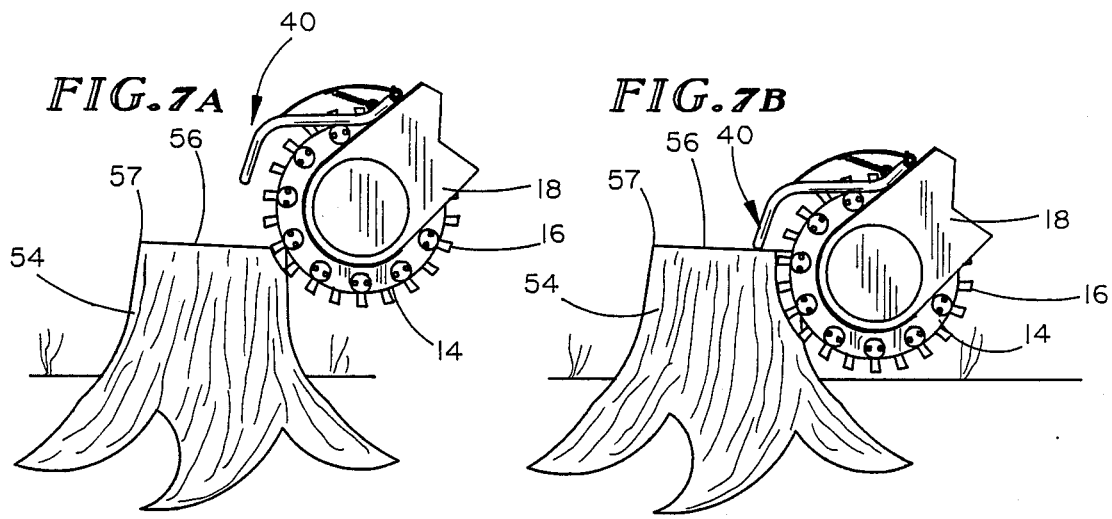
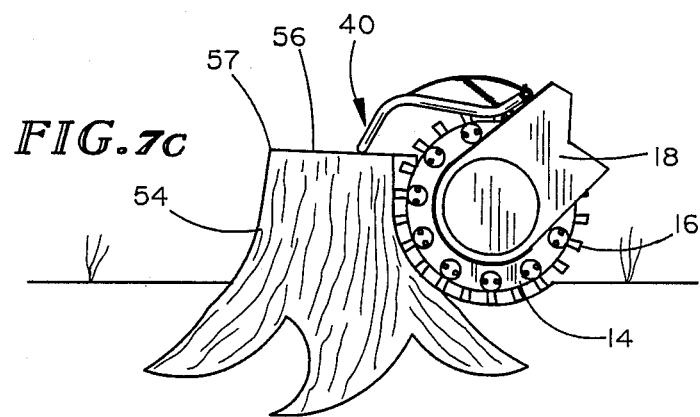
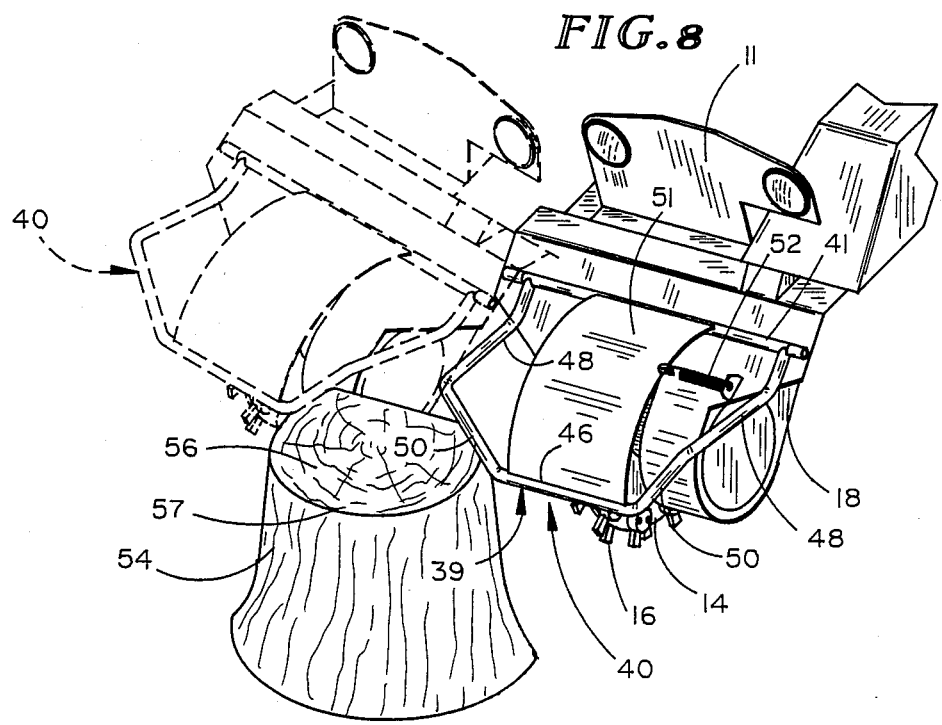

GUARD UNIT FOR A STUMP REMOVING MACHINE CUTTER WHEEL

This invention relates generally to stump removing machines and in particular to a guard unit for the cutter wheel of a stump removing machine.

BACKGROUND OF THE INVENTION

Guard units for the cutter wheels of stump cutting machines generally consist of a metal hood that is welded or otherwise fixed to the machine frame in a covering relation with a forward portion of the cutter wheel. Additionally, these guard units are of a small size relative to the cutter wheel so as not to engage a stump during a cutting operation. This relation between the cutter wheel and the guard unit permits a working clearance of the guard unit with a stump during the manipulation of the cutter wheel in a stump removing operation. Although some of these guard units are pivotally supported or hinged, rather than fixed, on the machine frame, this pivotal action is for the convenience of moving the guard unit into a position for exposing the cutting teeth for maintenance or replacement purposes.

SUMMARY OF THE INVENTION

The cutter wheel guard unit of the present invention includes a unitary frame of an open tubular construction that has linear top and bottom sections arranged in a parallel relation connected by side sections of an angulate contour. The bottom section is of a reduced length relative to the top section and is located opposite the medial portion of the top section. Each side section has a first linear portion adjacent a terminal end of the top linear section that extends in a direction normal to the longitudinal axis of the top section and a second inclined portion that is connected with an adjacent end of the bottom linear section. A flat metal arcuate shield is connected between the top and bottom linear sections in a covering relation with the cutter wheel.

The top linear section is pivotally supported on the machine frame for up and down pivotal movement of the guard unit from a rest position to an operating position in a substantially constant clearance relation with the cutter wheel to permit a free movement of the cutter wheel relative to a stump during a stump cutting operation. When the cutter wheel is in cutting engagement with the stump, the bottom linear section of the guard unit rides on the top surface of the stump and, when the stump is removed and during the cutting of the tree roots for removal, the bottom section is freely rideable on the ground surface. On movement of the cutter wheel laterally of the stump from positions out of cutting engagement therewith to positions into stump cutting engagement, the inclined side portions contact the edge of the stump top surface to automatically cam or lift the bottom linear section upwardly to a riding position on the top surface of the stump. The guard unit thus automatically provides a guarded area for the cutter wheel during an entire stump removing operation.

DESCRIPTION OF THE DRAWINGS

FIG. 3 is a reduced side elevational detail view of the cutter wheel and guard assembly shown in FIG. 2;

FIG. 4 is a reduced side elevational view illustrated similarly to FIG. 1 wherein the cutter wheel is in the fully elevated rearward position therefor;

FIG. 5 is illustrated similarly to FIG. 4 and shows the cutter wheel in the fully lowered forward position therefor;

FIG. 6 is a diagramatic plan view of the articulated frame assembly of the machine shown in FIG. 1 with the cutter wheel illustrated in the neutral or center position therefor;

FIG. 7(a) is a diagramatic illustration showing the cutter wheel in a position to initially engage a stump to be removed and wherein the guard unit is free of the stump and in a covering relation with the upper forward quadrant of the cutter wheel;

FIG. 7(b) is illustrated similarly to FIG. 7(a) and shows the cutter wheel in an initial adjusted cutting position wherein the guard unit is rideable on the top surface of the stump and in a covering relation with the upper forward quadrant of the cutter wheel.

FIG. 7(c) is illustrated similarly to FIG. 7(b) and shows the relative positions of the cutter wheel and guard unit when the cutter wheel is in a final adjusted position; and FIG. 8 is a perspective view of the front end portion of the stump cutting machine showing the guard unit being elevated to a stump riding position in response to a movement of the cutter wheel laterally of the stump.

DESCRIPTION OF THE PREFERRED EMBODIMENT

Figure 1:
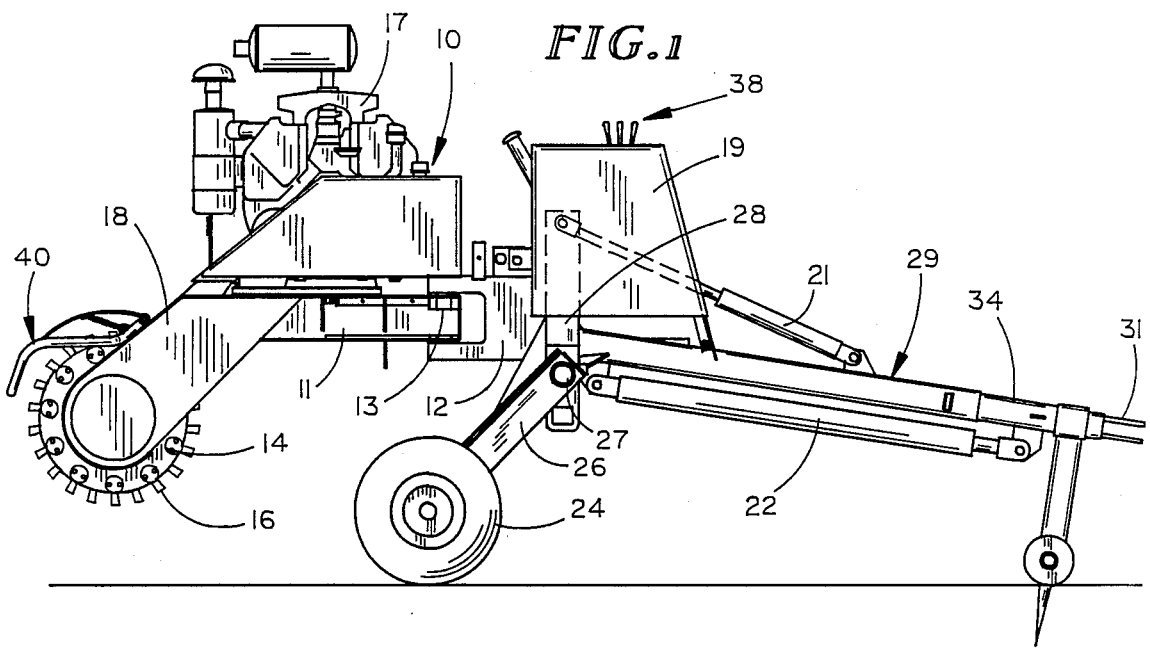
FIG. 1 is a side elevational view of a stump removing machine showing the cutter wheel guard unit of this invention mounted thereon.

Referring to FIG. 1, there is shown a commercial type stump removing machine 10 having an articulated main frame which includes a front frame section 11 and a rear frame section 12 and wherein the front section 11 is pivotally supported at 13 on the rear section for pivotal movement laterally of the machine. A stump cutting wheel 14, having cutting teeth 16, is rotatably supported from the frame section 11 at a position downwardly and forwardly therefrom. An engine 17 on the front frame section 11 is in driving association with the cutter wheel 14 through a belt assembly indicated generally at 18. A dual tank assembly shown at 19 includes a gas tank for the engine 17 and an oil reservoir, which is associated with hydraulic cylinder assemblies 21, 22 and 23 for moving the cutter wheel 14 vertically, fore and aft, and laterally, respectively, relative to a stump being removed.

The rear frame section 12 is mounted on a wheel and axle assembly 24, the axle of which carries a pair of transversely spaced rock arms 26, the free ends of which are mounted on a horizontal transverse rock shaft 27 rotatably supported on the rear frame section 12 below the dual tank assembly 19. A single intermediate rock arm 28 on the rock shaft 27 extends between the tanks of the assembly 19 for connection of its free end with the piston rod of the hydraulic cylinder 21. Extension of the cylinder 21 moves the assembly 24 rearwardly to, in turn, elevate the frame sections 11 and 12 and the cutter wheel 14 (FIGS. 1 and 4). Retraction of the cylinder 21 moves the assembly 24 forwardly to lower the cutter wheel from its position shown in FIG. 4 to the position thereof in FIG. 5.

A rearwardly extended telescopic tongue 29 on the frame section 12 is adapted for connection of its free end 31, with the draw bar (not shown) of a towing vehicle for transport of the machine 10 when the cutter wheel 14 is in the elevated position of FIG. 1. A tongue stand 32 for supporting the tongue 29, when the stump removing machine is in use, is equipped with ground insertible spikes 33 to anchor the machine for movement relative to a stump being removed. The cylinder 22 pivotally interconnects the inner telescoping member 34 with the rear frame section 12. Extension of the cylinder 22 from its position shown in FIGS. 1 and 4 to the position thereof in FIG. 5 moves the frame sections 11 and 12 as a unit fore and aft on the wheel assembly 24 relative to the tongue stand 32 providing for a fore and aft movement of the cutter wheel 14 relative to a stump being removed.

The cylinder 23 (FIG. 6) is pivotally connected to the tongue 29 at 36 and to the front frame section 11 at 37. In the cylinder position shown in full lines in FIG. 6, the frame sections 11 and 12 are in longitudinal alignment with the tongue 29. On extension of the cylinder 23, to the dotted line position thereof indicated at 23(a), the cutter wheel is moved laterally to the left of a stump being removed; and on retraction of the cylinder 23 is moved laterally to the right of the stump to its dotted line position shown at 23(b).

The cylinders 21, 22 and 23 are all controlled by associated control handles 38 carried on the oil reservoir portion of the dual tank assembly 19. It is seen, therefore, that in response to a manipulation of the control handles 38, the cutter wheel 14 is conveniently adjusted for movement in three directions relative to a stump; namely, laterally, vertically and in fore and aft directions.

Figure 2:
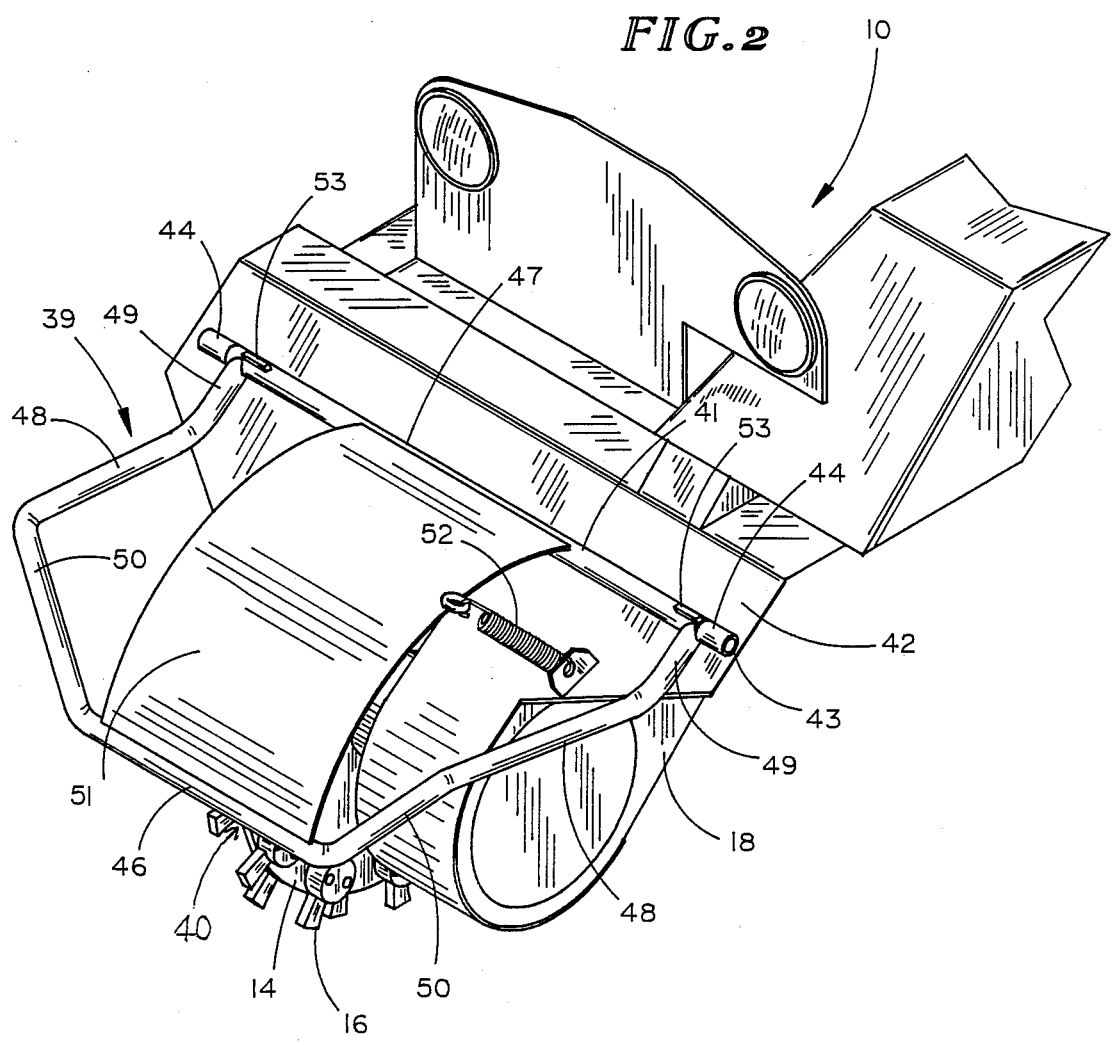
FIG. 2 is an enlarged detail perspective view of the front end portion of the machine in FIG. 1 to show the pivotal mounting of the guard unit on the machine.

The cutter wheel guard unit 40 of this invention (FIGS. 2 and 3) includes a frame 39 of a unitary tubular construction, having an upper linear section 41 which functions as a shaft to pivotally support the frame 39 for up and down pivotal movement on the front wall 42 of the machine 10. The terminal ends 43 of the upper linear section 41 are supported in bearing members 44 secured to the wall member 42. A bottom linear section 46, of a reduced length relative to the upper linear section 41, is located opposite the medial portion 47 of the upper linear section 41 and in a parallel relation therewith. A pair of side sections 48 of the frame 39 are of an angulate contour and, with the bottom linear section 46, are formed from a single piece of a cylindrical tubular material. Each side section 48 includes a terminal end portion 49 secured to the upper linear section 41 at positions inwardly of the bearing members 44. From the terminal ends 49, the side sections 48 converge inwardly for junction with the bottom linear section 46 with the portions 50 thereof adjacent the bottom section 46 being angularly inclined relative to the bottom section 46 to function as cam members relative to a stump being removed as will be described later.

A shield member 51 of an arcuate shape extends between and is connected to the bottom linear section 46 and medial portion 47 of the upper linear section 41, so as to be in a spaced covering relation with the upper forward quadrant of the cutter wheel 14. A spring member 52 connected to the front wall 42 and shield member 51 yieldably holds the terminal ends 49 of the side sections 48 in abutting engagement with the front wall member 42 to define the lower or rest position of the guard unit wherein the shield member 51 is in a spaced relation with the upper quadrant of the cutter wheel 16 as appears best in FIG. 3. A key 53 at each end of the upper linear section 41 (FIGS. 2 and 3) is engageable with the front wall 42 to limit the upward pivotal movement of the guard unit 40.

In operation, the cylinder assemblies 21, 22 and 23 are relatively actuated by manipulation of the control handles 38 to initially move the cutter wheel 14 into engagement with the rear top edge of a stump 54 to be removed as illustrated in FIG. 7(a). The cutter wheel 14 is then concurrently lowered and moved forwardly by actuation of the cylinders 22 and 21 into an initial cutting position with the stump. The final cutting position is shown in FIG. 7(c) wherein the cutting depth of the cutter wheel 14 is substantially at ground level. The cutter wheel 14 may have a diameter of about two feet and, depending upon the size of the stump, may operate at a cutting depth of about eight inches. When in the final cutting position, the cutter wheel is reciprocated laterally of the stump by actuation of the cylinder 23.

On completion of this first cut, and while retaining the depth of such cut, it is only necessary to progressively move the machine forwardly by actuation of the cylinder 22. After each forward movement, the cutter wheel is reciprocated laterally of the stump 54 by actuation of the cylinder 23. This procedure is continued until the stump 54 has been removed. It is to be noted that the teeth 16 are mounted to both sides of the peripheral portion of the cutter wheel as well as being projected radially therefrom. Additionally, the teeth move at a relatively high speed of about 5,000 to 6,000 feet per minute to facilitate the efficiency of the lateral cutting action.

In the lateral movement of the cutter wheel and as illustrated in FIG. 7(c), the linear bottom section 46 of the guard unit frame 39 is in riding engagement on the top surface 56 of the stump 54 over substantially the full length of the lateral cut. However, at each end of such cut, the linear bottom section 47 may move off of the stump surface 56. On a later swinging movement of the cutter wheel 14 toward the stump to take a next cut laterally thereof, the inclined section 50 of a side section 48, on engaging the side edge 57 of the stump top surface 56 will function as a cam follower relative to such edge to lift the bottom linear section 46 to its position for riding engagement on the surface 56. The bottom section 46 and adjacent inclined sections 50 thus constitute a bottom stump engaging member which functions to automatically maintain the guard unit 40 in a covering clearance relation with the upper forward quadrant of the cutter wheel 14, without interfering with the stump cutting operation and, with the unitary frame 39 defining a constant guarded area about the cutter wheel as best appears in FIGS. 2 and 8.

Although the invention has been described with respect to a preferred embodiment thereof, it is to be understood that it is not to be so limited since changes and modifications can be made therein within the full intended scope of the invention as defined by the appended claims.

I claim:

1. A guard unit for the cutter wheel of a stump removing machine having a frame member reciprocally moveable laterally, vertically and fore and aft of the top surface of a stump being removed, and a cutter wheel rotatably mounted on said frame member for movement therewith, said guard unit comprising:

(a) a unitary frame having a top linear section mountable on said frame member for rotation about a horizontal axis extended transversely of and above said cutter wheel; and a bottom stump engaging section having a central portion with outwardly and upwardly inclined end portions, (b) said central portion, during a lateral cutting movement of said cutter wheel in one direction being rideable on said top surface, and one of said end portions, on a reversal of said lateral cutting movement, being engageable with an edge portion of said top surface to position said central portion on said top surface, and (c) a shield member of an arcuate shape extended between and connected to the bottom central portion and the top linear section in a concentrically spaced relation with the upper forward quadrant of the cutter wheel.

2. A guard unit for the cutter wheel of a stump removing machine having a frame member movable laterally, vertically and fore and aft relative to a stump being removed and a cutter wheel rotatably mounted on said frame member for movement therewith, said guard unit comprising:

(a) a unitary frame having a top linear section mountable on said frame member for rotation about a horizontal axis extended transversely of and above said cutter wheel, (b) said unitary frame including a bottom linear section of a reduced length relative to said top linear section arranged in a parallel relation with said top section and opposite a medial portion of said top linear section, and side sections extended between and connected to the terminal ends of said top section and bottom section, each side section having an angulate shape to provide for the bottom section being offset from the top section in a direction toward the stump to be removed, and (c) a shield member of an arcuate shape extended between and connected to the bottom section and the medial portion of the top section in a covering clearance relation with an adjacent peripheral portion of the cutter wheel.

3. The guard unit for the cutter wheel of a stump removing machine according to claim 2 wherein:

(a) each side section has the end portion thereof connected to the bottom section inclined outwardly and upwardly toward a terminal end of said top section, with each end portion, on lateral movement of the cutter wheel to engage a stump, being movable into riding contact with a top edge of the stump to pivot the frame upwardly about said horizontal axis to position the bottom section of the frame on the top side of the stump with the shield member in a covering clearance relation with the cutter wheel.

4. The guard unit for the cutter wheel of a stump removing machine according to claim 2 wherein:

(a) said unitary frame is of a cylindrical tubular construction.

5. The guard unit for the cutter wheel of a stump removing machine according to claim 2 including:

(a) coacting means on said frame member and top linear section for limiting the upward rotation of said unitary frame to a position wherein said shield member is in a covering clearance relation with the cutter wheel, and (b) means for yieldably rotating said unitary frame in a downwardly direction to a rest position therefor wherein said shield member is in a covering clearance relation with the cutter wheel.

6. The guard unit for the cutter wheel of a stump removing machine according to claim 2 wherein:

(a) said top section, bottom section and side sections define a guarded area for the forward leading half of the cutter wheel, with the end portions of the side sections adjacent the bottom section acting to guide the bottom section into riding engagement on the top surface of a stump being removed during reciprocal lateral movement of the cutter wheel whereby to continuously maintain the cutter wheel within the guarded area.

* * * * *